United States Patent [19]

Stirbis

[11] Patent Number: 4,509,555

[45] Date of Patent: Apr. 9, 1985

[54] DISK TRANSFER SYSTEM

[75] Inventor: James S. Stirbis, Littleton, Colo.

[73] Assignee: Adolph Coors Company, Golden, Colo.

[21] Appl. No.: 578,812

[22] Filed: Feb. 10, 1984

Related U.S. Application Data

[63] Continuation of Ser. No. 464,555, Feb. 7, 1983.

[51] Int. Cl.[3] ...................... F16K 25/00; B65G 47/04; B41F 17/20

[52] U.S. Cl. ............................... 137/625.11; 251/188; 251/192; 251/172; 101/40; 198/482; 198/689

[58] Field of Search ...................... 137/625.13, 625.15; 251/172, 175, 187, 188, 192; 101/40; 198/482, 689

[56] References Cited

U.S. PATENT DOCUMENTS

| | | | |
|---|---|---|---|
| 2,996,083 | 8/1961 | Huska | 251/175 |
| 3,040,777 | 6/1962 | Carson et al. | 137/625.15 |
| 3,131,605 | 5/1964 | LaBorde | 137/625.15 |
| 3,198,004 | 8/1965 | Roberts et al. | 137/625.15 |

*Primary Examiner*—11

*Assistant Examiner*—John A. Rivell

*Attorney, Agent, or Firm*—Klaas & Law

[57] ABSTRACT

Apparatus for continuously conveying decorated container members having wet ink images on the outer periphery thereof between a first continuously moving rotatable mandrel wheel type container carrying apparatus of a high speed container decorator or coater machine and a high speed second continuously linearly moving pin chain container carrying apparatus comprising: a continuously rotatable disk type conveyor rotatably movable in a predetermined endless path between the first and second continuously moving container carrying apparatus including a first path portion located in juxtaposition to the first continuously moving container carrying apparatus for receiving decorated container members therefrom and a second path portion located in juxtaposition to the second continuously moving container carrying apparatus delivering decorated container members thereto; a plurality of individual cirumferentially spaced vacuum cups fixedly peripherally mounted in equally spaced relationship on and extending laterally outwardly of and being continuously movable with said disk type conveyor in fixed relationship therewith for holding a single container member on each vacuum cups, only by application of vacuum therefrom. thereto during movement between the first and second continuously moving container carrying apparatus and for releasing container members therefrom only by removal of vacuum therefrom.

1 Claim, 12 Drawing Figures

DISK TRANSFER SYSTEM

This is a continuation of application Ser. No. 464,555, filed Feb. 7, 1983.

BACKGROUND AND SUMMARY OF INVENTION

The present invention generally relates to the container manufacturing art and, more particularly, container conveyor and transfer apparatus used in connection with the decoration or coating of containers such as can body members.

At the present time, can body member type containers, sometimes also referred to as cans, are conventionally decorated or coated by continuously moving decorator apparatus, sometimes also referred to as printing or printer or coater apparatus, which has a continuously rotatable container carrying mandrel wheel with circumferential spaced container carrying mandrel devices for carrying undecorated containers along a first arcuate path of movement from a loading station to a transfer station, with circumjacent ink applying devices being associated with the container along the path of movement thereof to apply ink images onto the outer peripheral container surfaces. The decorated containers are conventionally transferred from the rotatable mandrel wheel to circumferentially spaced support devices on a continuously rotatable container transfer wheel which carries the decorated containers away from the rotatable mandrel wheel along a second arcuate path. The decorated containers are then conventionally directly transferred from the rotatable transfer wheel to longitudinally spaced support pins on a continuously moving container conveyor chain, sometimes referred to as a deco chain, by which the decorated containers are carried to and through an ink curing and drying oven. Examples of prior art apparatus of this type are shown in the following U.S. Pat. Nos. Porterfield 3,016,163; Brigham, et al. 3,227,070; Borkmann 3,231,061; Hartmeister 3,261,281; Smith, et al. 3,279,360; Brigham, et al. 3,300,019; Cartwright 3,469,670; Cvacho, et al. 3,496,863; Zurick 3,521,554; Cvacho, et al. 3,537,187; Sirvet, et al. 3,548,745; Cvacho, et al. 3,563,170; Sirvet 3,567,043; Gould 3,586,175; Russel 3,613,571; Sirvet, et al. 3,616,778; and Sirvet, et al. 3,766,851.

In order to prevent containers from falling off pins on a chain during conveyance to and through an oven, it has been conventional practice for many years to mount the chain in an inclined position so that the pins are upwardly inclined and hold the containers in an upwardly inclined position thereon as shown in D'Errico U.S. Pat. No. 3,176,823; Hartmeister U.S. Pat. No. 3,261,281, and Sirvet et al. U.S. Pat. No. 3,766,851. In order to effect transfer of decorated containers from the rotatable transfer wheel of a decorator apparatus to a deco chain, it also has been conventional practice for many years to utilize a construction and arrangement such that the pins are gradually telescopically inserted into the containers, prior to effecting transfer of the containers onto the pins, by the simple expedient of causing relative axial displacement between the containers and the pins during conveyance between the rotatable transfer wheel and the deco chain as illustrated by the aforementioned patents.

In the prior art, the rotatable transfer wheel apparatus and mandrel wheel means have been of relatively complicated, expensive, heavyweight and large size construction to effect the required relationships of the containers relative to and between the rotatable mandrel wheel and the deco chain and to effect the transfer of the containers therebetween. Conventional rotatable transfer wheel apparatus has employed mechanisms to effect axial displacement of the cans carried thereby. Conventional transfer wheel apparatus and mandrel wheel apparatus have also employed mechanisms to change the path of movement of the cans from arcuate to linear during transfer of the cans. Thus, such prior art apparatus has not generally permitted the most effective use of available space and the most effective location and arrangement of the conventional apparatus. One attempt to solve some of these problems is disclosed in U.S. Pat. No. 4,222,479 of Dugan et al., the disclosure of which is incorporated herein by reference, which enables the elimination of the rotatable transfer wheel by the use of a continuously moving continuous loop lightweight inexpensive conveyor belt for conveying the containers directly from the rotatable mandrel wheel and for transferring the containers to the pins on the deco chain.

In general, the present invention solves the foregoing problems by use of a rotatable transfer wheel without any moving mechanical parts of the type heretofore employed for causing axial movement of suction cups to receive decorated cans from the mandrel wheel and associate the decorated cans with the deco chain. The present invention comprises a relatively narrow width lightweight rotatable support disk means. A plurality of suction cup means are fixedly mounted in circumferentially spaced relationship along the periphery of the support disk means for movement in a fixed circular path. Vacuum passage means, provided in the support disk means, connect each suction cup means to new and improved vacuum manifold means mounted adjacent the inner periphery of the support disk means.

THE DRAWINGS

A presently preferred and illustrative embodiment of the invention is shown in the accompanying drawings wherein.

IN GENERAL

Figure 1:
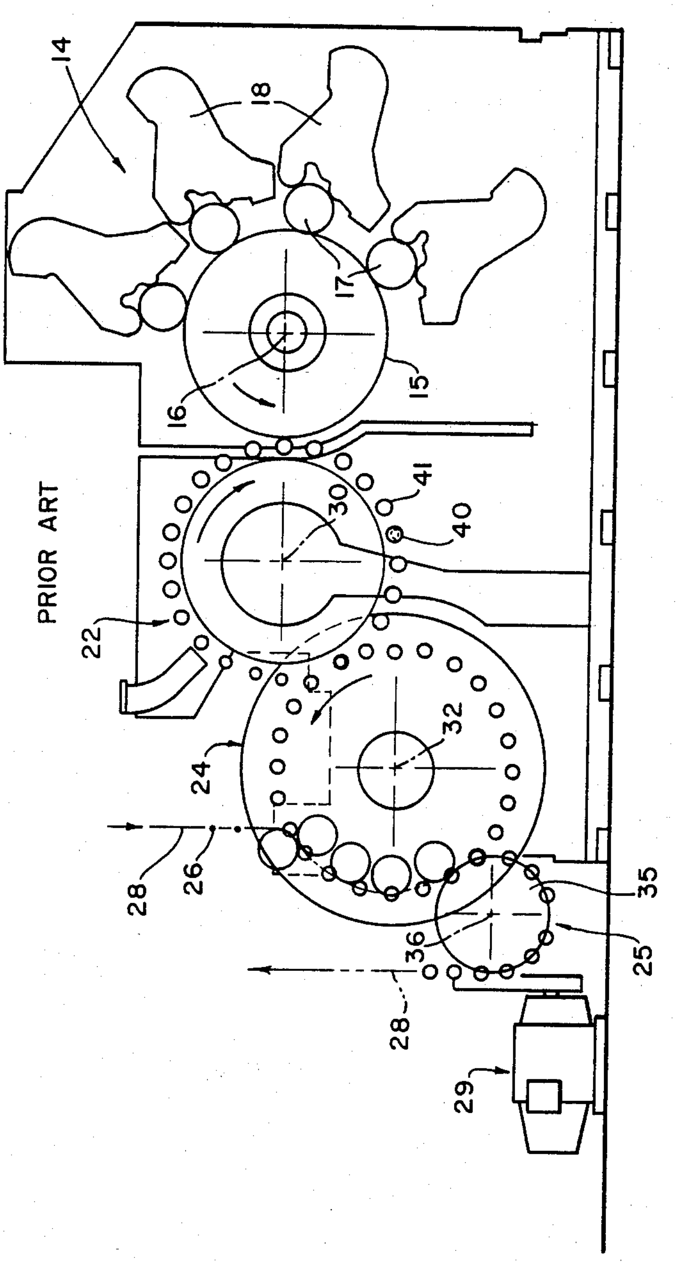
FIG. 1 is a schematic side elevational view of a conventional prior art arrangement of a conventional container decorator system utilizing a rotatable transfer wheel device.
Figure 2:
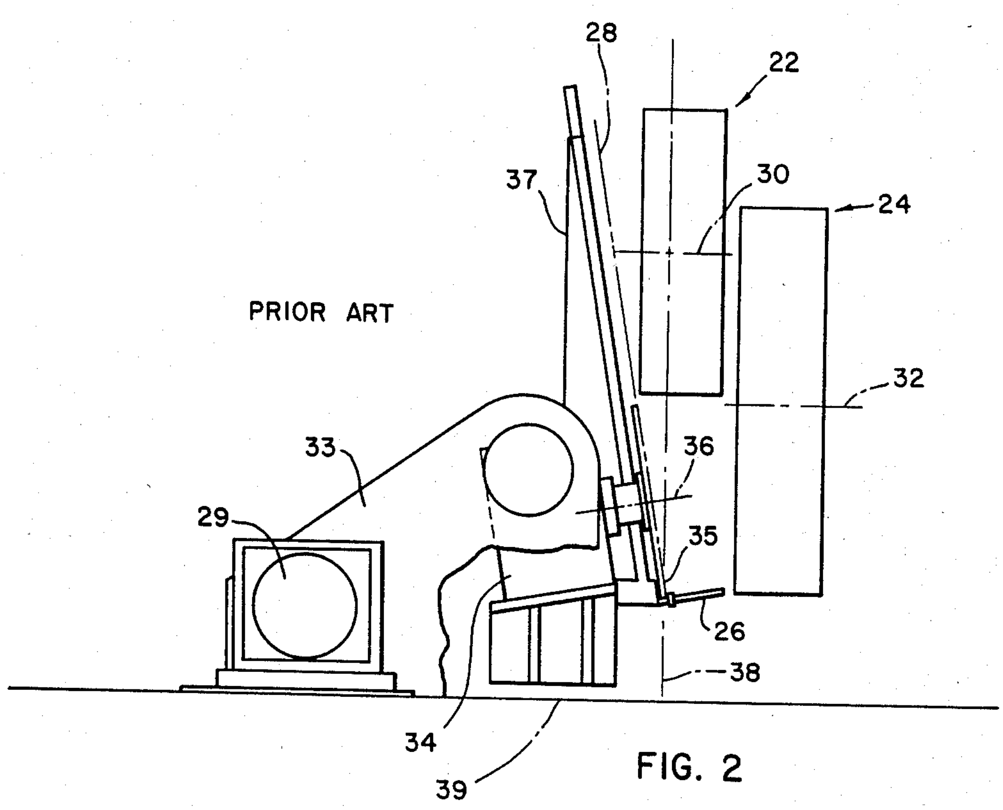
FIG. 2 is a schematic end view of a portion of the prior art apparatus of FIG. 1.
Figure 3:
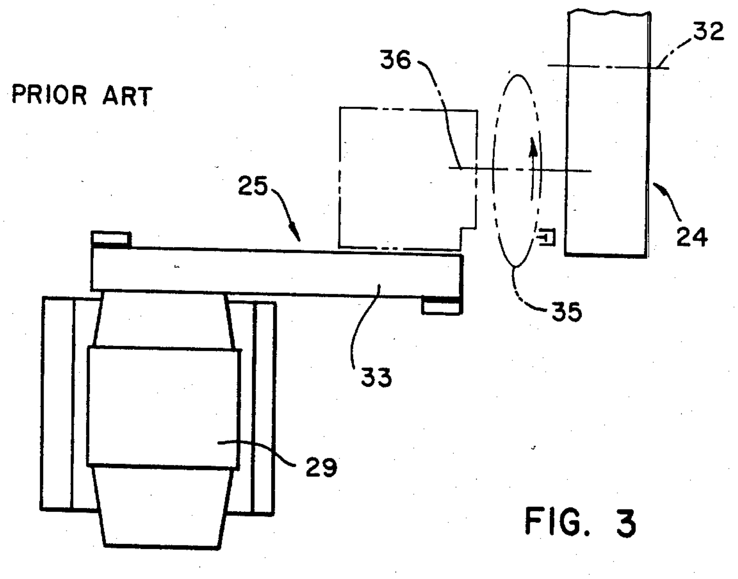
FIG. 3 is a schematic plan view of a portion of the prior art apparatus of FIGS. 1-2.

While it is contemplated that the inventive concepts may be used in conjunction with various kinds of apparatus, the apparatus of the present invention is particularly adapted for use in a container decorating or coating system of the type illustrated in FIGS. 1-3, which comprises: a conventional ink applicator means 14 including a blanket wheel means 15 rotatable about a horizontal axis of rotation 16 in engagement with plate cylinders 17 associated with ink application apparatus 18; a conventional continuously rotatable container carrying mandrel wheel means 22 for carrying containers to be decorated into engagement with the blanket wheel means 15 to coat or decorate the containers by application of ink images to the outer peripheral surface thereof; a conventional continuously rotatable decorated container transfer wheel means 24 for receiving decorated containers from the container mandrel wheel means 22 and for transferring the decorated containers to chain conveyor means 25 having spaced pin members 26 carried by a continuous inclined deco chain member 28; and motor means 29 for synchronously driving the aforedescribed apparatus by suitable connecting means (not shown). The rotatable mandrel wheel means 22 and the transfer wheel means 24 are ordinarily rotatable about vertically and horizontally spaced parallel horizontal axes 30, 32. The chain conveyor means 25 is driven by the motor means 29 through a transmission belt means 33, a speed reduction gear means 34, and a chain drive sprocket wheel 35, having an axis of rotation 36, mounted on a generally vertically upwardly inclined extending chain support frame assembly 37. The chain member 28, support frame assembly 37 and chain drive sprocket wheel 35 are inclined relative to a vertical plane 38, as has been conventional for many years as illustrated by Hartmeister U.S. Pat. No. 3,261,281 and D'Errico U.S. Pat. No. 3,176,823, so that rotational axis 36 and the pin members 26 are inclined relative to a horizontal plane 39 at an angle of approximately 7° to 10°, and the paths of movement of the chain drive sprocket wheel 35, the pin members 26, and chain member 28 are inclined relative to a vertical plane at a corresponding angle for the purpose of preventing the decorated containers from falling off the pin members 26 during transfer to an ink curing-drying oven (not shown).

Mandrel Wheel Means

Figure 4:
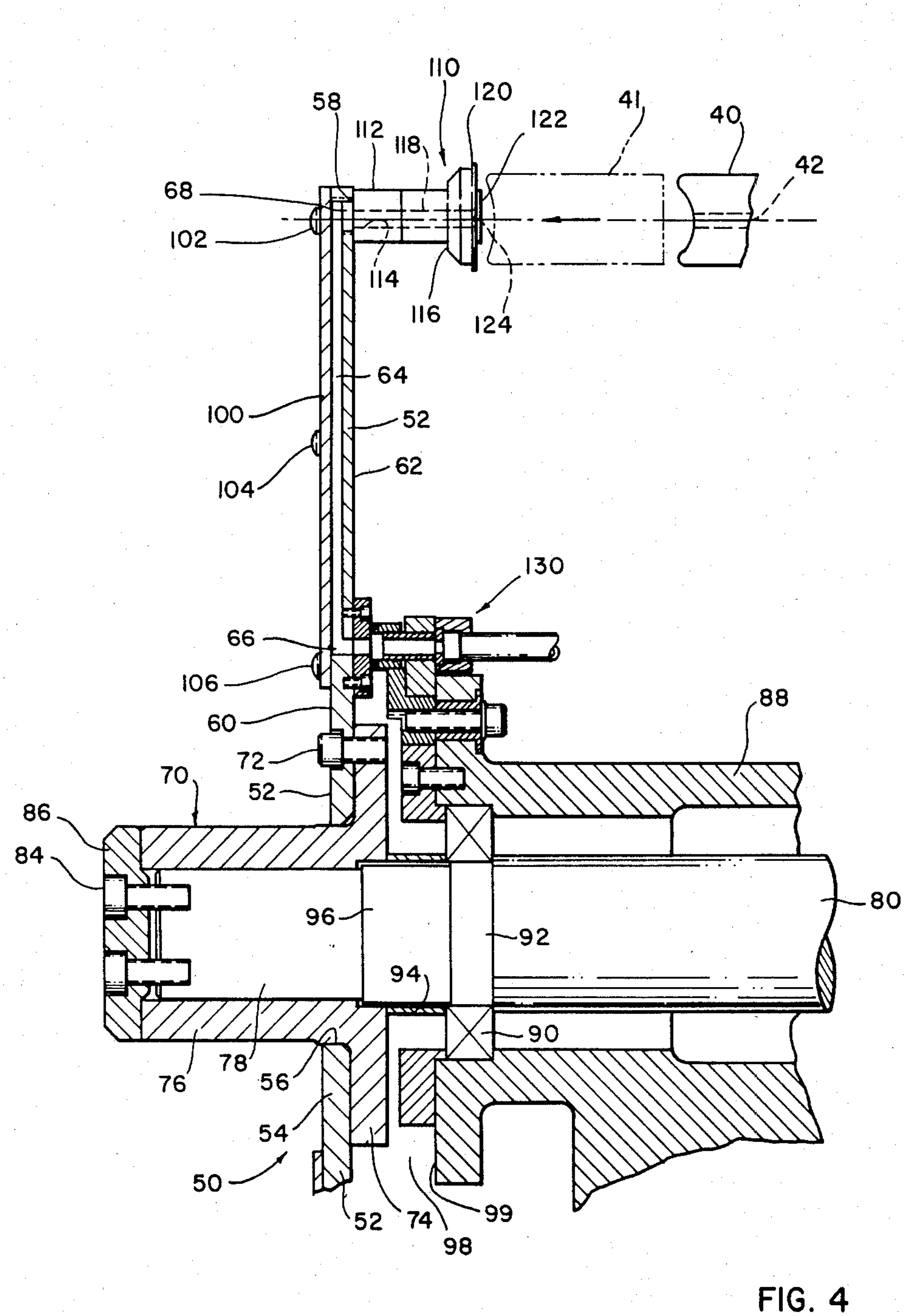
FIG. 4 is a cross-sectional side elevational view of a portion of a disk transfer unit of the present invention.

The container mandrel wheel means 22, which is rotatably movable along a rotational path in a vertical plane in the direction of the arrow, carries a plurality of circumferentially spaced container carrying mandrels 40 which extend horizontally parallel to the axis of rotation 30. The mandrel wheel means may be designed to carry decorated containers 41 from the ink applicator means 14 along an arcuate path or conventional cam means (not shown) may be provided to change the arcuate path of movement during a portion of the movement along a transfer zone opposite the transfer wheel means 24 for alignment with the arcuate path of movement of suction cup devices on the transfer wheel means. Vacuum and air passage means 42, FIG. 4, in the mandrels are connected to vacuum source means to hold the container members on the mandrels during movement of the transfer zone whereat the vacuum is terminated, and are connected to pressurized air source means in the transfer zone to blow the containers off the mandrels to effect transfer to the rotatable transfer means.

Disk Transfer Means

As illustrated in FIGS. 4-8, the present invention involves replacement of a conventional rotatable transfer wheel means 24 of a conventional decorator system with a rotatable disk transfer means 50 mounted between the conventional mandrel wheel means 22 and conventional chain conveyor means 25.

The disk transfer means 50 comprises a one-piece annular support disk member 52, which is preferably made of machined aluminum plate or cast material to reduce weight, and has a relatively large diameter (e.g., 42.5 inches) and a relatively narrow width (e.g. 0.625 inch). Disk member 52 has an inner annular rim portion 54 defining a central opening 56, an outer annular rim portion 58, and opposite flat parallel side surfaces 60, 62. A plurality of circumferentially spaced radially extending passages 64 are formed along side surface 60. Each passage 64 terminates in radially inner and outer transverse passages 66, 68 which extend through the opposite side surface 62 of support disk member 52. Support disk member 52 is fixedly attached to a hub means 70 by suitable bolt means 72. Hub means 70 comprises a flange member 74 fixed to a sleeve member 76 which is rotatably connected to an end portion 78 of a drive shaft 80 by bolt members 84 extending through an end cap member 86. Shaft 80 is rotatably supported in a hub member 88 by bearing means 90 on shaft portion 92. A spacer sleeve member 94 is mounted on shaft portion 96 between bearing means 90 and sleeve member 76 to provide a gap 98 between flange member 74 and the end surface 99 of hub member 88. An annular cover plate means 100 made of aluminum plate material is fixedly sealably mounted on disk surface 60 by suitable bolt means 102, 104, 106 to enclose radial passages 64 and transverse passages 66, 68.

A plurality of circumferentially spaced suction cup means 110 of conventional design, as described in U.S. Pat. No. 4,222,479, are fixedly mounted along the outer peripheral disk rim portion 58 opposite transverse passages 68 by suitable bolt means 108. Each suction cup means 110 comprises an annular spacer member 112, having a central passage 114, a support head member 116 having a central passage 118, a resilient bumper pad member 120, and a resilient suction cup assembly 122 with a central passage 124.

Figure 5:
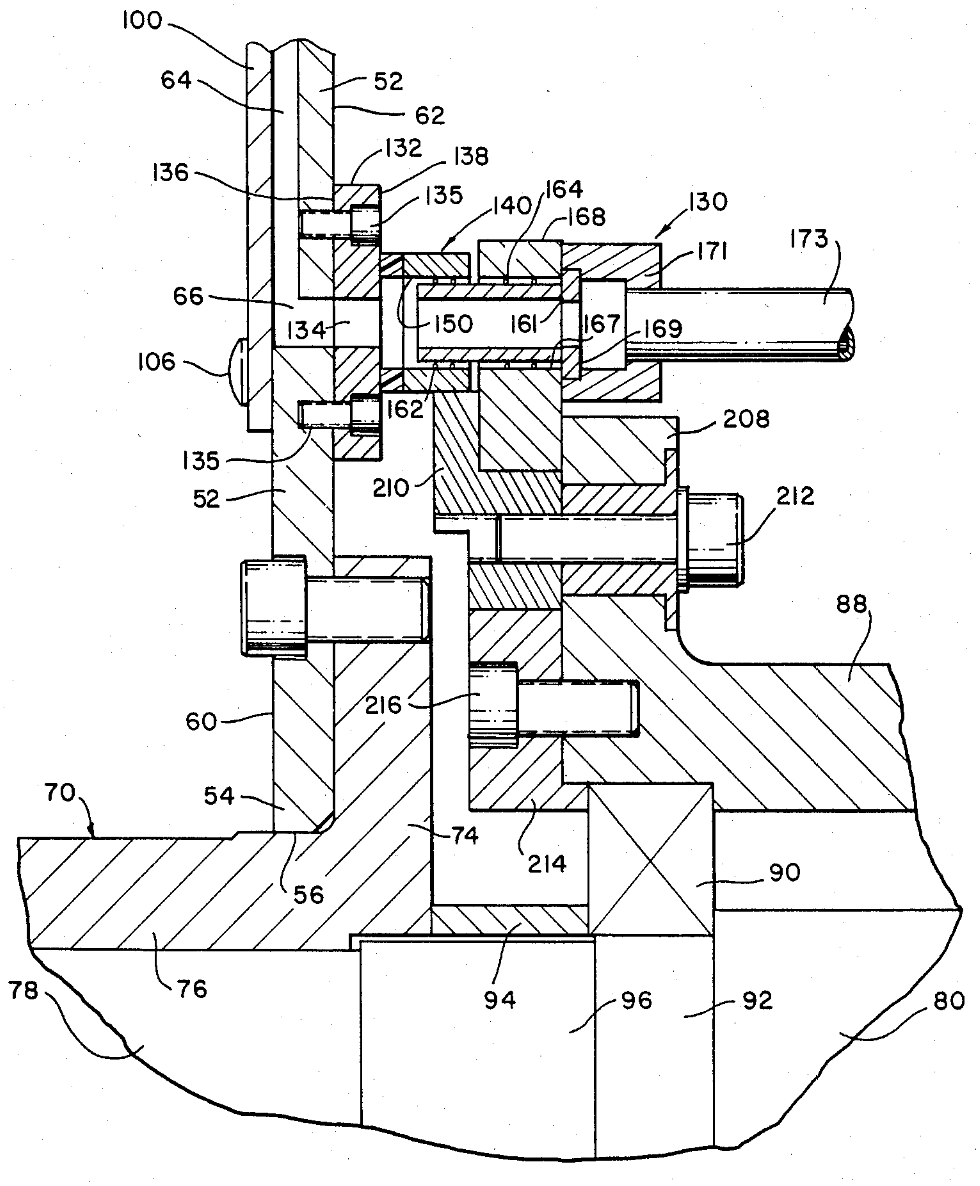
FIG. 5 is an enlarged cross-sectional view of the vacuum supply portion of the disk transfer unit of FIG. 4.
Figure 6:
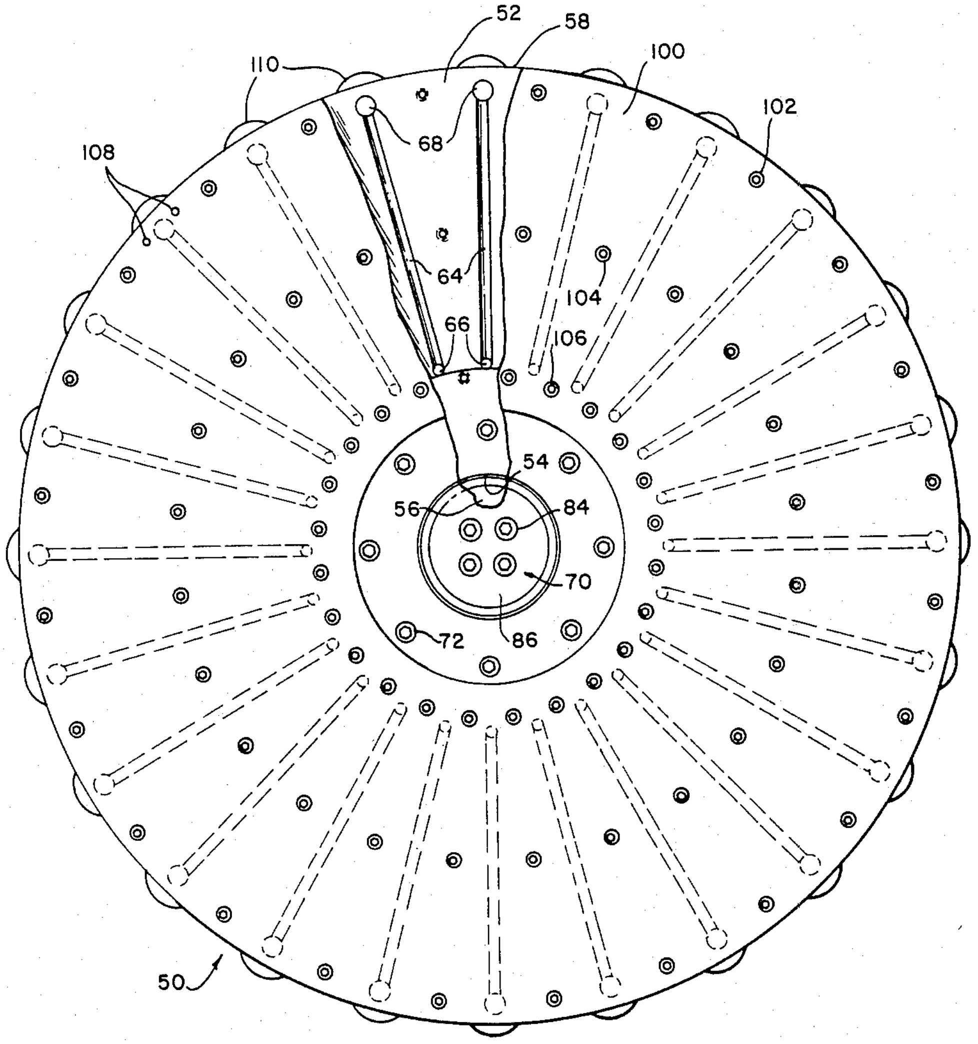
FIG. 6 is an end view of the disk transfer unit of FIG. 4 with parts removed.
Figure 7:
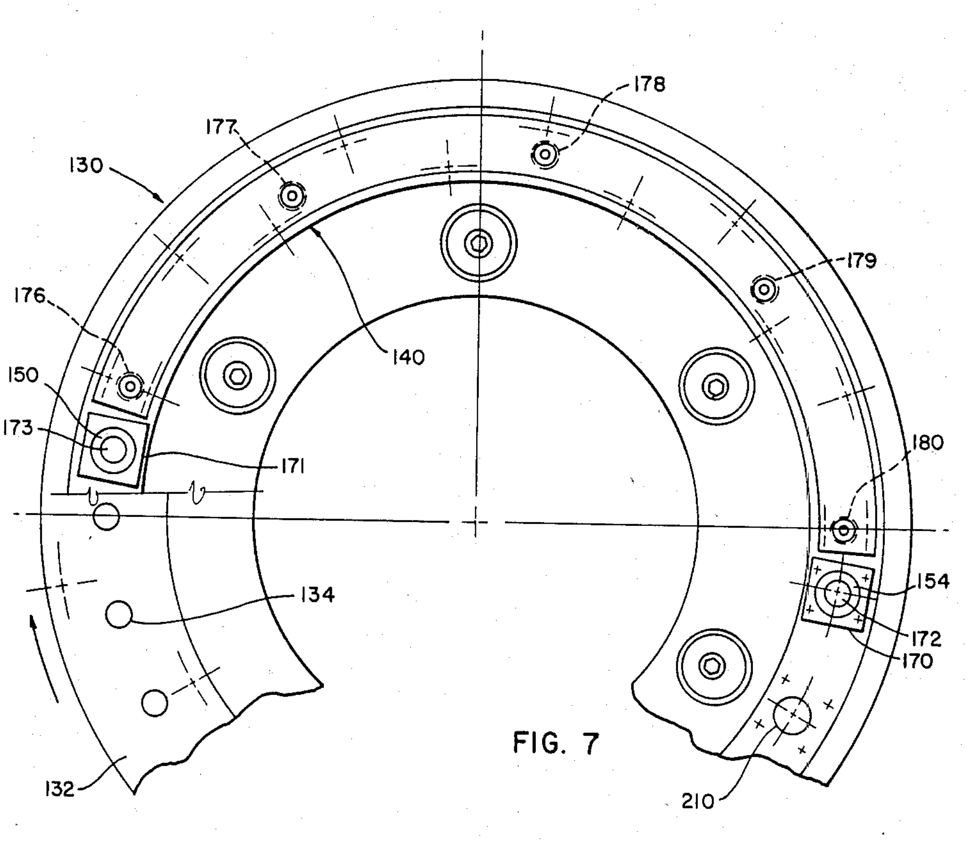
FIG. 7 is an end view of the vacuum supply portion of the disk transfer unit with parts removed.
Figure 8:
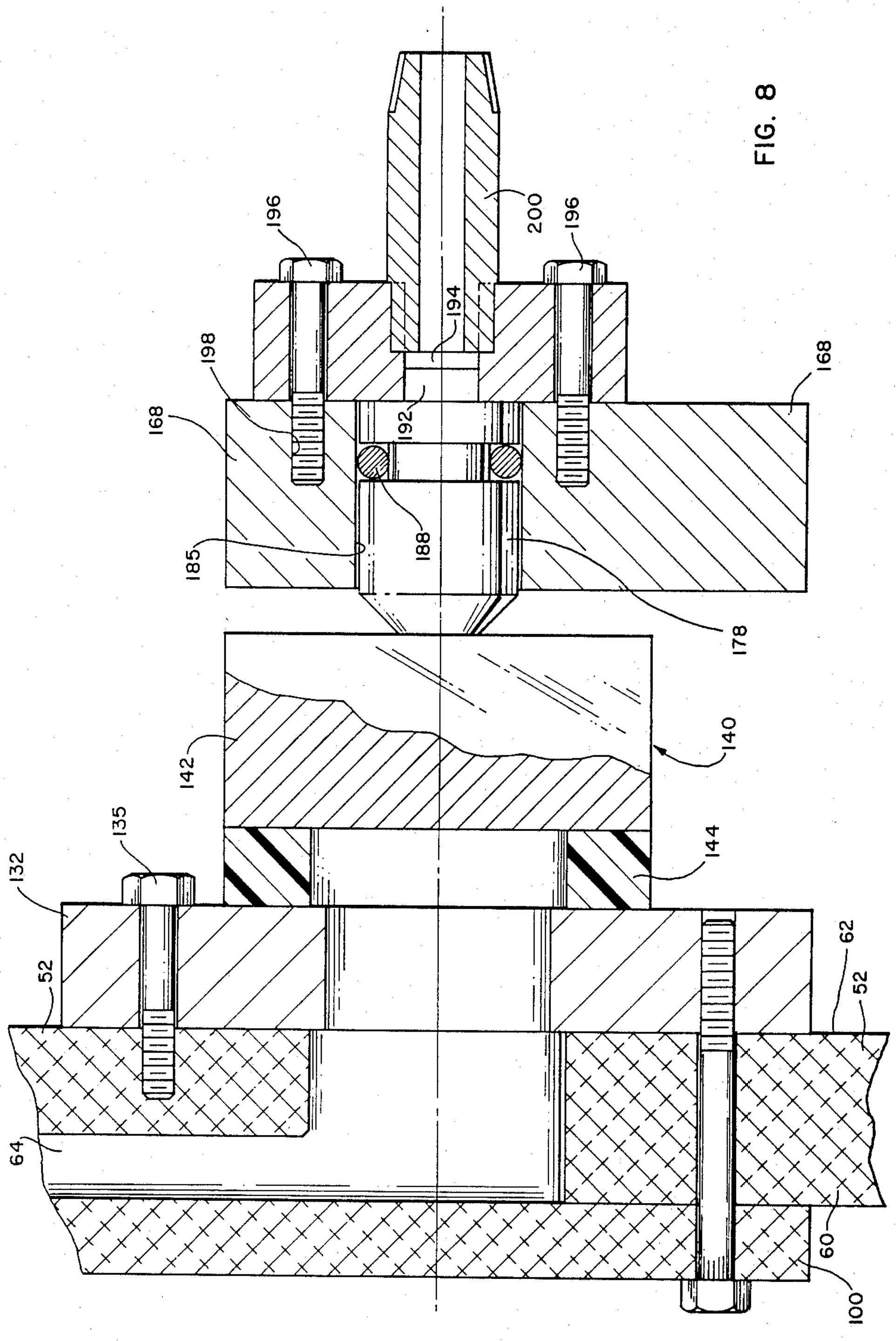
FIG. 8 is an enlarged cross-sectional view of a portion of the vacuum supply means taken along line 8—8 in FIG. 7.
Figure 9:
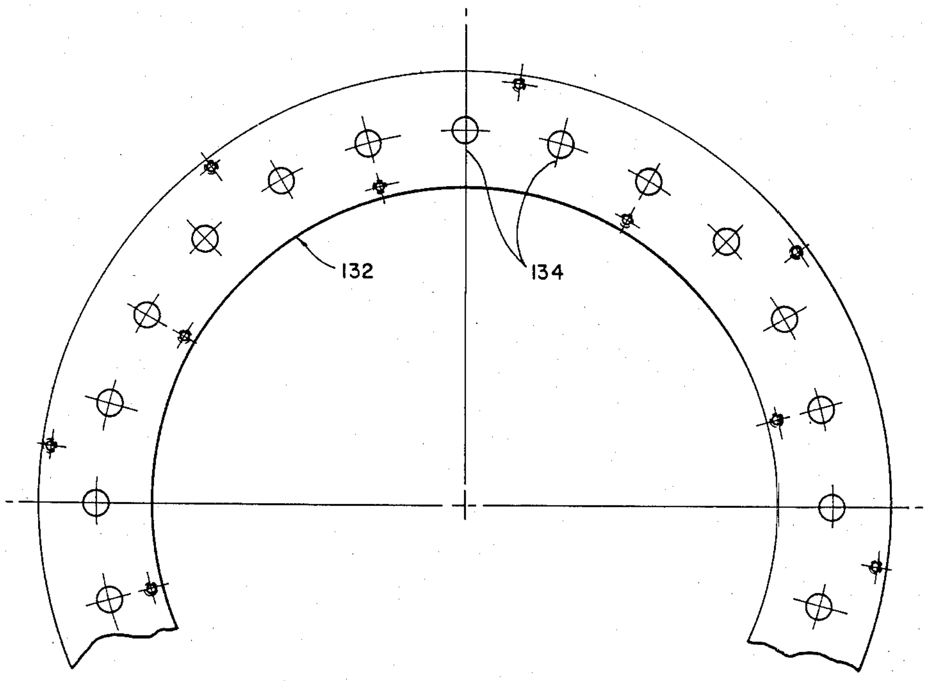
FIG. 9 is a side view of the manifold connecting plate.
Figure 10:
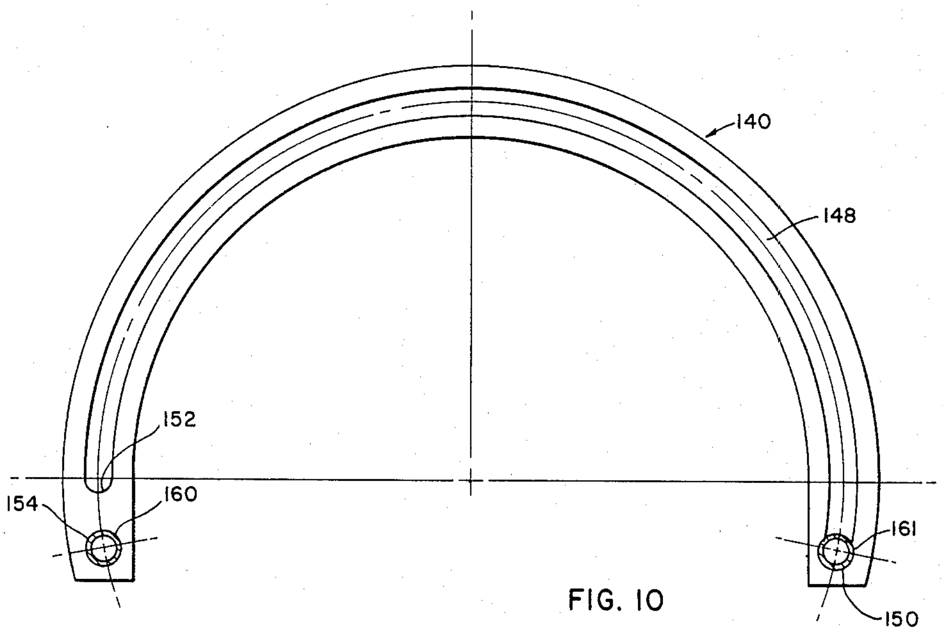
FIG. 10 is a side view of the manifold.

A vacuum supply means 130, FIG. 5, sequentially connects and disconnects the suction cup means 110 relative to a source of vacuum (not shown) through passages 64, 66, 68, 114, 118, 124. Vacuum supply means 130 comprises an annular connecting plate means 132 having circumferentially spaced passages 134, FIGS. 7 and 9, located opposite inner disk passages 66 and sealably fixedly mounted on disk side surface 62 by bolt means 135. Connecting plate 132 is preferably made of heat treated steel material with flat machined opposite parallel side surfaces 136, 138. Vacuum supply means 130 further comprises an arcuate manifold segment means 140 which is non-rotatably mounted opposite an 180° portion of wear plate 132. As shown in FIGS. 8 and 10, manifold means 140 comprises an 180° arcuate segment body member 142 made of machined steel material and a correspondingly shaped plastic wear member 144 bonded to outer side surface 146 of body member 142. Manifold means 140 has an arcuate slot 148, FIG. 10, which terminates at one end in a transverse annular vacuum supply passage 150 so as to provide vacuum throughout slot 148 and at the other end in a transverse wall portion 152 circumferentially spaced from a transverse annular passage 154. Additional vacuum supply passages and/or air passages may be provided as necessary or desirable.

Figure 11:
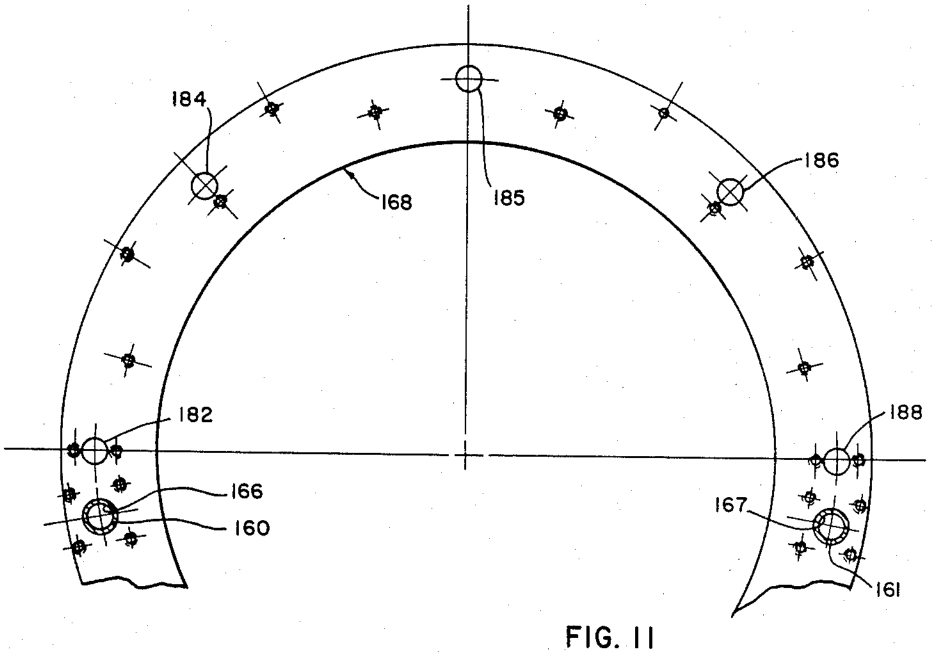
FIG. 11 is a side view of the manifold support ring.
Figure 12:
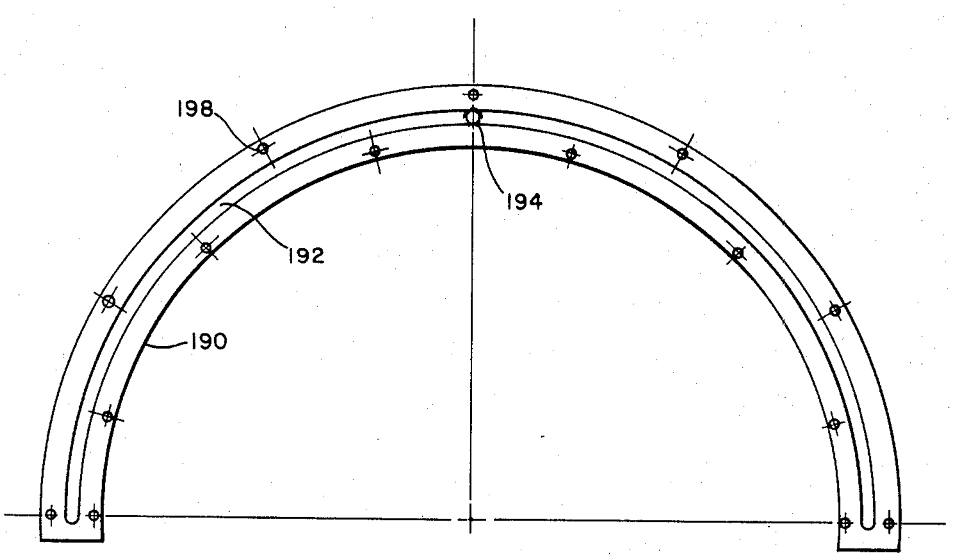
FIG. 12 is a side view of the air supply segment.

Manifold means 140 is circumferentially located and held against rotational movement by a plurality of annular sleeve members 160, 161, FIGS. 5 and 10. Each sleeve member has an end portion with O-ring seals 162 located in axially slidably sealable relationship in manifold passages 150, 154 to enable relative axial displacement therebetween. An intermediate portion of each sleeve member with O-ring seals 164 is mounted in annular transverse passages 166, 167, FIG. 11, in an annular support ring means 168. A flange 169 at the rear end portion of each sleeve member abuts the side surface of support ring means 168 and is held thereon by mounting boxes 170, 171, FIG. 7, which are connected to a pressurized air supply line 172 to provide a positive can blow-off means, if desired, and a vacuum line 173. The manifold means 140 is axially biased toward and held in engagement with rotatable connector plate 132 by a plurality of air operated piston devices 176, 177, 178, 179, 180, FIGS. 7 and 8, slidably sealably mounted in annular passages 182, 183, 184, 185, 186, FIG. 11, in support ring means 168. Each piston device has an O-ring seal 188. An air supply segment member 190, FIG. 12, having an air supply slot 192 and an air inlet port 194, FIG. 8, is fixedly sealably mounted on carrier ring means 168 by suitable bolt means 196 mounted in bolt holes 198. A pipe nipple 200 is mounted in an air inlet portion 194 and connected to a supply of pressurized air. Carrier ring means 168 is fixedly mounted on a flange portion 208 of hub portion 88 by bracket means 210 and bolt means 212 located radially outwardly of a bearing retainer ring means 214 fastened by bolt means 216. An important advantage of this construction and arrangement is that there is no load on the sleeve members 160, 161 or biasing piston means exerted by the nipple construction or air/vacuum hoses which are supported solely by the connecting block members.

In operation, disk transfer means 50 is continuously rotated with shaft 80 in predetermined timed relationship to the continuously rotating mandrel wheel means and the continuously moving deco chain means. Vacuum connecting plate 132 rotates relative to the manifold means 140. Vacuum is maintained in arcuate slot 148. When each passage 134 in plate 132 becomes aligned with slot 148, vacuum is applied to each associated suction cup means 110 through passages 64, 66, 68 in disk support means 52 until each passage 134 rotates beyond the manifold means whereupon the vacuum is dissipated. Vacuum is applied to each of the suction cup means 110 when each suction cup means becomes aligned with a mandrel carrying a decorated can. The can on the mandrel is then transferred from the mandrel to the suction cup means by being blown off the mandrel and onto the aligned suction cup means by pressurized air. The can is held on the suction cup means by vacuum until the can carried by the suction cup means becomes aligned with an associated pin on the deco chain means. When the associated pin has entered the can, vacuum is dissipated at the vacuum cup means. Then, the inherent resiliency of the vacuum cap means causes outward flexing movement which axially displaces the can toward the pin while releasing the can from the vacuum cup means. In some cases, it may be desirable to connect both ends of groove 148 to vacuum and provide a positive blowoff means in the form of an air port 210, FIG. 7, connected to a source of pressurized air. It is to be understood that the axial movement of the can caused by the inherent resiliency of the vacuum cup means is not required to transfer the can to the deco pin because the angle of inclination of the deco chain by itself may be sufficient to properly locate the deco pin in the can prior to release of vacuum. Also, positive can blow-off is not required.

While the present invention is particularly adapted for conveyance and transfer of containers to a deco chain, the inventive concepts may also be used to accommodate various kinds and arrangements of container manufacturing apparatus including not only decorator system apparatus but also other kinds of manufacturing apparatus. Thus, it is intended the appended claims be construed to include various alternative modifications and embodiments of the invention except insofar as limited by the prior art.

What is claimed is:

1. A system for connecting a plurality of circumferentially spaced ports on a rotating member to an air or vacuum chamber in a non-rotatable manifold member located in axially spaced juxtaposition to said rotating member which comprises:

mounting means for holding said manifold member in circumferentially fixed relationship to said rotating member while enabling axial movement of said manifold member relative to said rotating member; and biasing means operatively associated with said manifold member for holding said manifold member in engagement with said rotating member while permitting limited axial displacement of said manifold member relative to said rotating member, said biasing means including a plurality of circumferentially spaced reciprocably mounted piston abuttingly engaging said manifold member and biasing said manifold member in a direction parallel to the direction of reciprocal movement of said reciprocally mounted piston means into engagement with said rotating member; and pressurized air means connected to said piston means for applying force thereon to hold said piston means in engagement with said manifold member while enabling variable axial location of said piston means relative to said manifold member.

* * * * *